TRANSFLUXOR CIRCUIT HAVING LINEAR RESPONSE CHARACTERISTIC

Filed May 10, 1968 3 Sheets-Sheet 1

INVENTORS
SAMADU OHTERU
HIROSHI KOBAYASHI
KAZUO FUKIAGE
YUSHI UCHIDA
BY
Hopgood & Calimafde
ATTORNEYS

TRANSFLUXOR CIRCUIT HAVING LINEAR RESPONSE CHARACTERISTIC

INVENTORS
SAMADU OHTERU
HIROSHI KOBAYASHI
KAZUO FUKIAGE
YUSHI UCHIDA
BY
Hopgood & Calimafde
ATTORNEYS

TRANSFLUXOR CIRCUIT HAVING LINEAR RESPONSE CHARACTERISTIC

Filed May 10, 1968 3 Sheets-Sheet 3

INVENTORS
SAMADU OHTERU
HIROSHI KOBAYASHI
KAZUO FUKIAGE
YUSHI UCHIDA

BY Hopgood & Calimafde
ATTORNEYS

United States Patent Office 3,543,257

Patented Nov. 24, 1970

3,543,257

TRANSFLUXOR CIRCUIT HAVING LINEAR RESPONSE CHARACTERISTIC

Sadamu Ohteru, Hiroshi Kobayashi, Kazuo Fukiage, and Yushi Uchida, Tokyo-to, Japan, assignors to Nippon Electric Company, Limited, Tokyo, Japan, a corporation of Japan Filed May 10, 1968, Ser. No. 728,184
Claims priority, application Japan, May 11, 1967, 42/29,945
Int. Cl. G11c *11/08*
U.S. Cl. 340—174 18 Claims

ABSTRACT OF THE DISCLOSURE

A transfluxor circuit is described having an unusually linear response characteristic for the non-destructive storage and read-out of an analog signal. A magnetic transfluxor having multiple apertures is used and includes a write-in yoke, and a pair of read-out yokes on opposite sides of an aperture. In response to a read-out pulse, a flux is formed in the transfluxor for opposing undesirable bias flux normally produced by conventional read-out circuits. In one embodiment, a separate winding produces the opposing flux, and in another embodiment, selective cross-coupling between read-out windings provides the opposing flux.

This invention relates generally to improvements in transfluxor type magnetic memory, devices, and more particularly to new and improved circuit arrangements for transfluxors which will be much better adapted for analog storage with non-destructive read-out capabilities than any of the conventional circuit arrangements. As has been publicly known, transfluxors have found numerous applications as analog storage elements with non-destructive read-out capabilities among various kinds of magnetic memory devices intended for such qualifications.

The transfluxor may be said to be composed of a multi-aperture core of magnetic material with a rectangular hysteresis loop, wherein a plurality of magnetic circuits can be formed through a plurality of yokes constituting a portion of the magnetic core, and a plurality of windings provided on the yokes.

Although transfluxors in the succeeding description have been assumed to be of two-aperture type, it will be understood that this is merely for ease of understanding and the principles of this invention can find application equally in multi-aperture transfluxors in general.

The magnetic circuits in such a transfluxor consist usually of a write-in magnetic circuit of circular form for write-in operation and a read-out magnetic circuit, also of loop form, occupying a part of the write-in magnetic circuit for read-out operation.

On the yoke constituting a part of the write-in magnetic circuit the write-in (input) winding is provided, which is connected to a write-in pulse source, whereas two read-out (output) windings, with the same number of ampereturns are provided respectively on the yokes both constituting a part of the read-out magnetic circuit. The ampereturns (AT's) of these read-out windings are designed so as to magnetize the read-out (output) magnetic circuit in opposite directions. Read-out current pulses (driving current) are conducted in the read-out windings alternately, while the load is connected so as to terminate the two read-out windings in common therewith or to a separate output winding provided on the read-out magnetic circuit.

Now operation of such a transfluxor with the load connected in common to the read-out windings will be outlined. Suppose, at first, the write-in magnetic circuit has been magnetically saturated in either direction. This state is commonly called "blocked" and the load current maxima occur under this blocked state. Second, only the first pulse in a train of write-in pulses (of an arbitrary waveform such as a squarewave) is applied to the write-in winding (this action is called "setting"). The setting current (or voltage) pulse causes the write-in magnetic circuit to be partially magnetized in a direction opposite to that for the blocked state. In this case, each of the read-out windings becomes much more inductive, with the result that the load current is decreased. With the progress of setting by applying the succeeding pulses, one after one, to the input winding, the moment is eventually reached at which one-half of the magnetic flux that has been produced suffers polarity reversal. At this moment, the load current reaches a minimum.

If the write-in process is further continued from this point with the polarity of write-in pulses inverted (this action of applying the polarity-inverted write-in pulses is called "resetting"), the magnetized state in the transfluxor is eventually restored to the blocked state and the load current maximum is restored. Such variations of the load current as a function of the number of write-in pulses applied to the write-in winding of a transfluxor will be termed herein the control characteristics of the transfluxor. Incidentally, in order that non-destructive read-out is possible, transfluxor cores should be so dimensioned that the write-in magnetic circuit may be more easily or earlier saturated than the read-out magnetic circuit.

A description has been given above of the circuit arrangement of conventional transfluxors. These conventional transfluxors had essentially some inherent drawbacks as will be enumerated, which have considerably restricted the scope of applications of transfluxors as analog memory elements.

(1) In order to increase the number of analog memory stages of a particular transfluxor of constant storage capacity, both the amplitude and duration of the write-in pulses need be diminished. This tends to cause the control characteristics of the transfluxor to be degraded in both setting and resetting. In other words, variation of the load current becomes extremely small or substantially nil for such diminished setting or resetting pulses.

(2) With an increase in the ambient temperature, the squareness of the hysteresis loop of the magnetic material of which the core is made is degraded, which, in turn, degrades the control characteristics of the transfluxor.

Accordingly the principal object of this invention is to provide new and improved transfluxors of the kind which can successfully prevent degradation in the control characteristics, as mentioned previously and which has a wide load current range and many memory stages.

Prior to the present invention, the causes for degradation in the control characteristics of conventional transfluxors had been thoroughly investigated by both theory and experiment. We have discovered the fact that the principal cause of this degradation is the bias-like magnetic effect for the write-in magnetic circuit caused by the ampereturns of the read-out windings, which exerts a deleterious influence on the stored memory contents in the write-in magnetic circuit and which, in turn, deteriorates the characteristics of the transfluxor in setting or resetting.

It is therefore a further object of this invention to provice a transfluxor circuit arrangement capable of displaying excellent characteristics over a wide load current range and of assumings numerous (say, as many as one hundred) memory stages by designing and incorporating therein, as a simple and effective means, read-out windings whose numbers of ampereturns have been modified, as compared with those of conventional read-out windings, in such a manner that the bias-like effect which invariably affects deleteriously either setting or resetting may be reduced to some suitable small value without substantially sacrificing the difference between the load current maximum and minimum.

Now the principles of the invention and other objects and features thereof will be described further in detail with reference to the accompanying drawings and in connection with several embodiments illustrated therein for representing some successful experimental models whose excellence of characteristics have been fully demonstrated.

Figure 1:
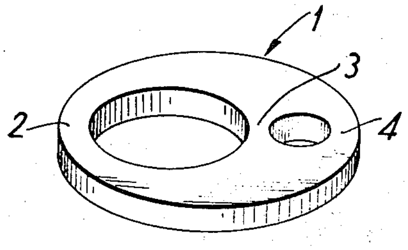
FIG. 1 is a perspective view of a most simple form of magnetic core for use in a transfluxor type magnetic memory device.

Referring to FIG. 1 illustrating a most simple example of a transfluxor core with three yokes 2, 3, and 4, it will be seen that the write-in magnetic circuit consists of two loop-form paths surrounding the larger aperture respectively through yokes 2–3 and 2–4, while the read-out magnetic circuit is around the smaller aperture through yokes 3 and 4. The core is dimensioned so that the effective cross-sectional area of yoke 2 may be equal to or larger than the sum of those of yokes 3 and 4 and that the effective cross-sectional area of yoke 3 is equal to that of yoke 4.

Figure 2:
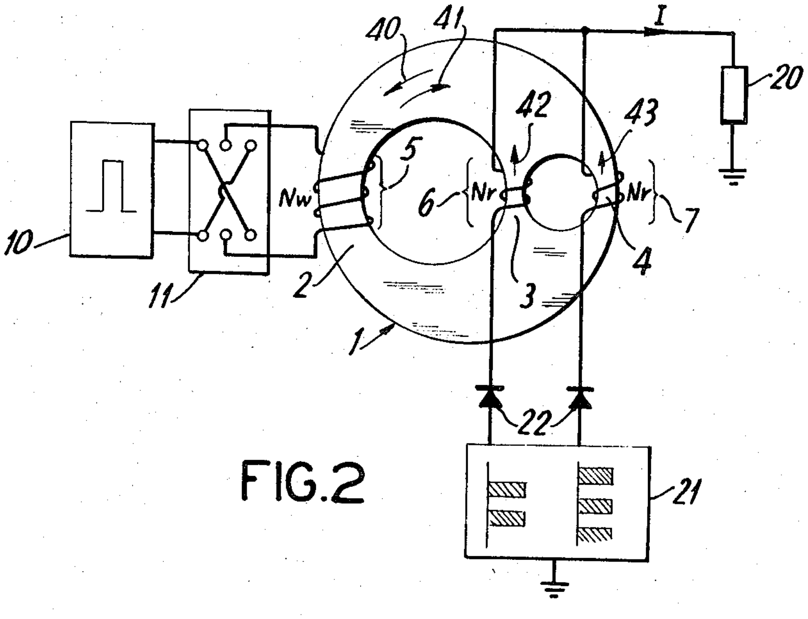
FIG. 2 is a schematic representation of a typical circuit arrangement for a conventional transfluxor using a two-aperture magnetic core as illustrated in FIG. 1.

Referring to the schematic representation of a basic circuit arrangement for a conventional analog storage type transfluxor intended for non-destructive read-out shown in FIG. 2, the numbers of turns in the windings 5, 6, and 7 provided on yokes 2, 3 and 4 are respectively denoted by $Nw$, $Nr$, and $Nr$, while the write-in winding is connected to the pulse generator 10 via a polarity-reversal switch 11, while the pulse generator 21 is connected to the read-out windings 6 and 7 via the load 20 and the two diodes 22.

This pulse generator 21 may, for example, be an ordinary multivibrator with two sets of output terminals through which driving currents are fed to the read-out windings 6 and 7 on a push-pull basis.

Figure 3:
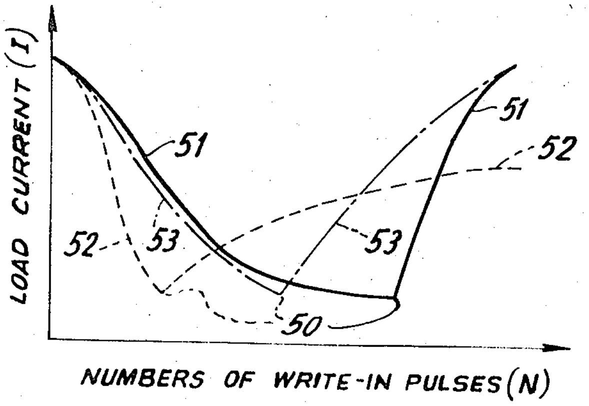
FIG. 3 is a plot of curves illustrating the manner in which the load current varies with the number of write-in pulses to demonstrate superiority of the control characteristics of a transfluxor modified by this invention to those of a conventional transfluxor.

Suppose, at first, the transfluxor has been blocked in the direction shown by the arrow 40 and then, write-in pulses of suitable amplitude are conducted, one after another, in the input winding for setting the transfluxor, step by step, in the direction shown by the arrow 41. Then, referring to FIG. 3 illustrating the control characteristics of the transfluxor shown in FIG. 2 and a transfluxor improved by this invention, the load current 1 in the load 20 falls down from the current maximum along the solid-line curve 51 with an increase in the number of write-in pulses.

Suppose, after the current minimum has been reached, the polarity of the write-in pulses is reversed by the switch 11 and the write-in operation is continued. The load current will then rise along the solid-line curve 51. If the transfluxor is initially blocked in the direction shown by the arrow 41, variation of the load current occurs as indicated by the dashed curve 52. In other words, when the transfluxor is operated with the circuit arrangement as shown in FIG. 2, the control characteristics manifest a marked difference between setting and resetting, that is, provided the transfluxor has been blocked in the direction of arrow 41, the initial maximum current value can never be restored, no matter how long resetting may be continued as clearly indicated by the dashed curve 52.

The principal defect of transfluxors with such circuit arrangement is that the actual characteristics were appreciably deviated from an ideal V-shaped curve which is preferred for analog storage.

This gives rise to some incidental defects as follows:

Analog storage of signals becomes substantially difficult for write-in pulses of small amplitudes, with the result that the number of memory stages cannot be established as precisely as desired.

The load current control range is extremely restricted.

It has been verified by both theory and experiment with conventional transfluxors that these defects were aggravated with an increase in the ambient temperature and that to relieve these defects the dimensional variation of magnetic cores had to be maintained within close tolerances in the manufacture.

Our experimental and theoretical reasoning for the main cause of these defects was as follows:

When the load current I flows in the read-out windings 6 and 7 in FIG. 2 alternately, their ampereturns cause the read-out yokes 3 and 4 to be magnetized alternately in the same direction as shown by the arrows 42 and 43. This produces a similar effect for the write-in magnetic circuit as would be obtained if a separate biasing magnetic field were applied. Stated specifically, when the write-in magnetic circuit is blocked in the direction 40 in FIG. 2, the biasing magnetic field is directed so as to oppose the direction of magnetization in setting, but to conform to that in resetting. This signifies that a stronger or a weaker magnetomotive force is needed on the input side for setting or resetting than would be required if no biasing magnetic field were present, whereby setting and resetting become, difficult and easy, respectively. On the contrary, when the write-in magnetic circuit is blocked in the direction 41 in FIG. 2, the biasing magnetic field is directed so as to conform to the direction of magnetization in setting, but to oppose to that in resetting, whereby setting becomes easy, while resetting becomes difficult.

In either case, the bias-like effect will be the more pronounced the larger the reversible permeabilities of magnetic core materials. This tendency is attributable to the following phenomenon:

A part of the magnetic flux that has been produced in the write-in magnetic circuit by write-in operation is lost without substantially contributing to the analog storage in the presence of the reversible permeability, but the amount of magnetic flux that will be lost is less or larger than would be lost in the absence of the bias-like effect according to whether the direction of magnetization aids or opposes the biasing magnetic field.

From the foregoing it will be evident that the causes for degradation in the characteristic of transfluxors with the circuit arrangement as shown in FIG. 2 can be attributed to the occurrence of the bias-like magnetic effect due to the load current flowing in the read-out windings and the presence of the reversible permeability of magnetic material of which the transfluxor core is made. In order to realize transfluxors with the optimum control characteristics, the following is desired as could be understood from the above described and discovered bias-like effect.

The bias-like magnetic effect must be minimized and at the same time, a suitable small amount of the bias-like effect must be retained for positively utilizing it to compensate for the degradation in the transfluxor characteristics due to the presence of the reversible permeability.

Now some basic circuit arrangements for reducing the previously mentioned means into practice will be described in detail in conjunction with different embodiments of this invention illustrated in FIGS. 4 through 13.

Figure 4:
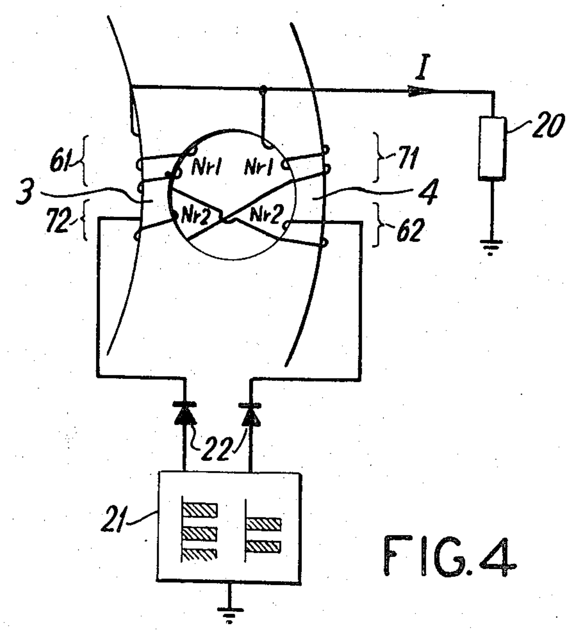
FIGS. 4 through 13 are enlarged schematic representations of different modes of read-out circuit arrangement for several transfluxors according to the principles of this invention.

FIG. 4 illustrates schematically a first embodiment of this invention, wherein, it will be understood, only the modified part of the transfluxor (corresponding to the part comprising yokes 3 and 4 in FIG. 2) has been drawn enlarged and the write-in portion which is substantially the same as that in FIG. 2 has been omitted for simplicity. This holds true for all of FIGS. 4 through 13.

Referring to FIG. 4, it will be seen that the read-out windings corresponding to windings 6 and 7 in FIG. 2 are respectively divided into two dissimilar windings connected in series, 61–62, and 71–72 and wound in succession on the two opposing yokes 3 and 4 which consitute together a part of the read-out magnetic circuit around the smaller aperture. Let the number of turns of each of read-out windings 61 and 71 and that of each of read-out winding 62 and 72 be $Nr_1$ and $Nr_2$, respectively. Then the previously mentioned bias-like effect with respect to the write-in magnetic circuit should be proportional to the difference between $Nr_1$ and $Nr_2$. By suitably selecting the ratio of $Nr_1/Nr_2$, it becomes possible to make the control characteristics as shown by the dot-dash curve 53 in FIG. 3 assuming that the direction of magnetization in the blocked state conforms to that in resetting. Should a relationship $$Nr = Nr_1 + Nr_2$$

be provided between the read-out windings in FIG. 4 and those in FIG. 2 the range of the load current in the case of FIG. 4 remains substantially the same as in the case of FIG. 2. Incidentally, all of the following embodiments of this invention (FIGS. 4 though 11) are alike in that optimum control characteristics as mentioned in the perivous example can be obtained by suitably arranging the turns of read-out windings on these yokes.

Figure 5:
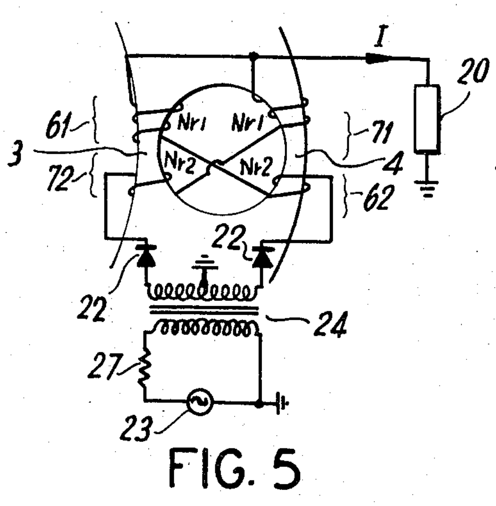

FIG. 5 is a schematic of a second embodiment of this invention, which is a modification of that shown in FIG. 4 in that an ordinary A.C. oscillator 23 is used as the read-out power source 21 and the read-out current is fed through a transformer 24 with an intermediate tap, 27 represents the source impedance of the A.C. oscillator 23.

Figure 6:
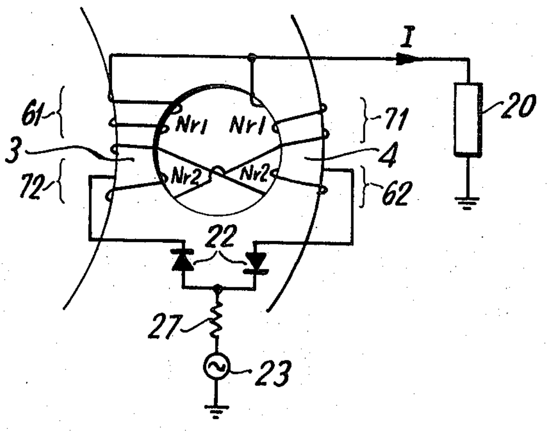

FIG. 6 illustrates a third embodiment of this invention. With this embodiment, besides an ordinary A.C. oscillator 23 being used as the read-out power source 21 shown in FIG. 4, one of the read-out windings is wound in the opposite sense and further, one of the diodes is connected in opposite polarity as compared with the arrangement shown in FIG. 5. In this case, alternating current flows in the load 20.

Figures 7, 8:
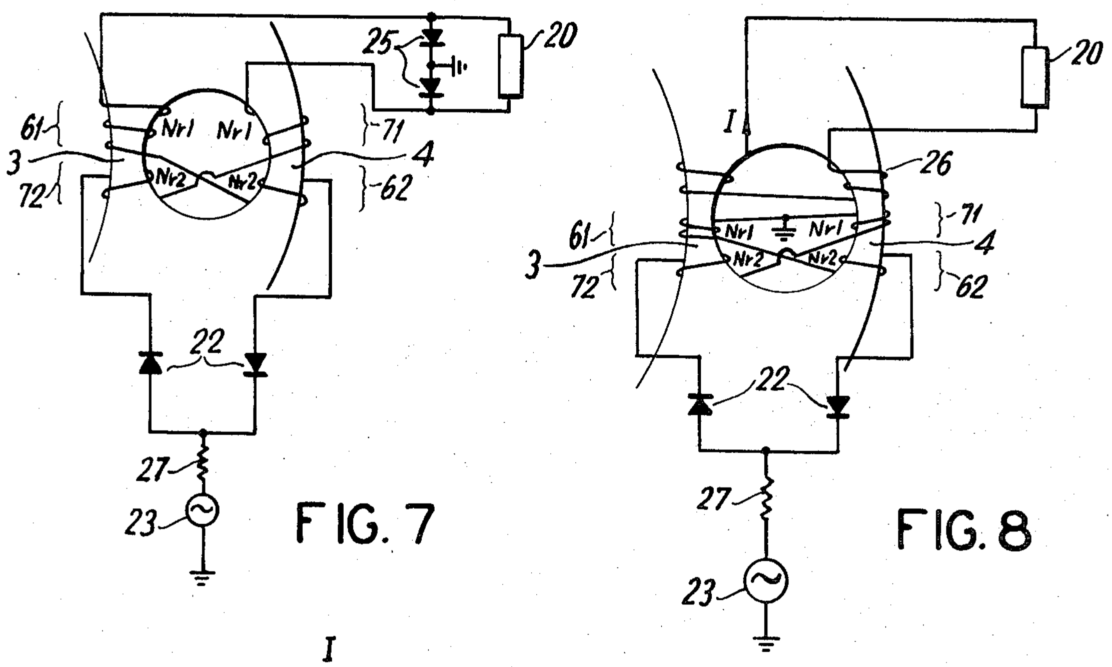

FIG. 7 illustrates a fourth embodiment of this invention, wherein, as compared with FIG. 6, two additional diodes 25 are installed as illustrated so that direct current may flow in the load 20. These diodes 25 may be replaced with two capacitors to constitute a voltage-doubler rectifier circuit.

FIG. 8 illustrates a fifth embodiment of this invention. This circuit arrangement differs from any one of the preceding embodiments in that a separate winding 26 (output winding) is provided on the yokes for constituting the readout magnetic circuit and the load 20 is connected to this output winding.

Figure 9:
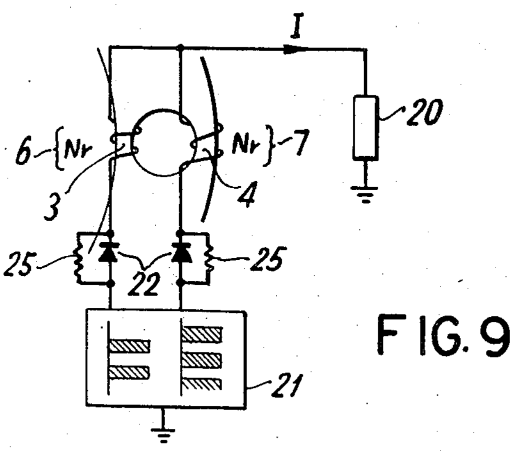

FIG. 9 illustrates a sixth embodiment of this invention. With this embodiment, a resistance 25 for adjusting the transfluxor characteristics is connected in shunt with each of the diodes 22 (this structure will be referred to as the shunt resistance system hereinafter). It is intended by this shunt resistance system to reduce the bias-like effect caused by the two read-out windings by suitably selecting the values of these resistances with respect to the impedance of the load 20.

For instance, suppose the forward currents of the diodes 22 conducted alternately in the read-out windings happens to flow in the winding 6. At this moment, a part of the forward current in the winding 6 is conducted in the winding 7 due to the presence of the shunt resistance connected across the opposited side diode (this current is not conducted in the load), provided that the values of the resistances 25 have been suitably preselected. Then it becomes possible to create a biasing magnetic field in the yoke 4 (or 3) in the opposite direction to that of the biasing magnetic field produced by the read-out winding 6 or 7, whereby the resultant bias-like effect can be reduced to a suitable small value. As a result, inasmuch as the direction of the biasing magnetic field conforms to that of magnetization in resetting, the favorable control characteristics as shown by the dots and dashes 53 in FIG. 3 can be obtained.

Figure 10:
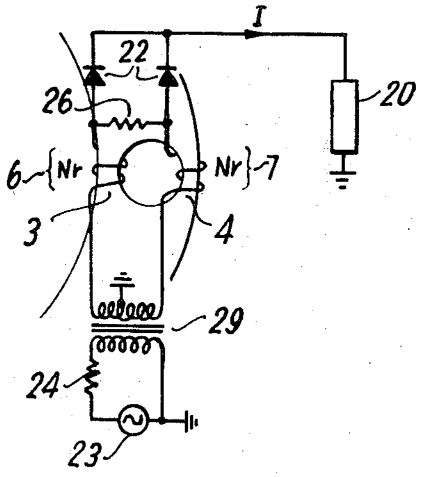

FIG. 10 illustrates a seventh embodiment of this invention. With this embodiment, the junctions of the two read-out windings and the two diodes are bridged across with a resistance 26 whose value has been suitably chosen for control of the biasing effect (this circuit structure will be referred to as the bridged resistance system). It is intended by this system to control the bias-like effect caused by the read-out windings to a minimum by suitably predetermining the value of the resistance with respect to the load impedance.

Suppose, for instance, that the forward current of the diode 22 flows in the read-out winding 6. Provided the value of the bridging resistance has been suitably predetermined, a part of the current which would otherwise be conducted in the load 20 can be flown in the read-out winding 7, whereby a biasing magnetic field can be created in the write-in magnetic circuit in a direction opposite to that of the biasing magnetic field produced by the read-out winding 6. Thus the resultant biasing effect can be minimized. Inasmuch as the direction of the resultant biasing magnetic field conforms to the direction of the magnetic field for resetting this transfluxor, the favorable control characteristics as depicted by the dots and dashes in FIG. 3 can be obtained.

This embodiment may be considered as a modification to the previous embodiment (in FIG. 9) in that the pulse generator has been replaced with a circuit consisting of an ordinary A.C. oscillator 23 having the equivalent function, source impedance 24, and a transformer with an intermediate tap. The seventh embodiment features simplicity of circuit arrangement, because only a single resistance is needed.

Although other embodiments belonging to either the shunt or the bridged resistance system will be illustrated and described hereinafter it will be understood that all of these embodiments can equally display favorable characteristics. Obviously, any succeeding embodiment of either system can be modified to the other, except for some particular cases.

Figure 11:
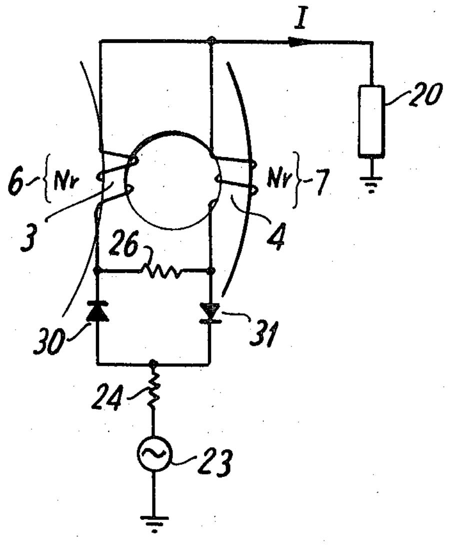

FIG. 11 illustrates an eighth embodiment of this invention. With this embodiment, the read-out windings 6 and 7 are provided on the yokes 6 and 7 so as to be subtractive, and diodes 30 and 31 are connected in opposite polarities to each other, a resistance whose value has been predetermined for the optimum characteristics of this transfluxor bridges across the diode side leads connected to the read-out windings, and an ordinary A.C. oscillator 23 as the read-out power source is connected in series with the load 20. I in this figure represents alternating current.

By suitably predetermining the value of the resistance 26, it becomes possible, as the load current I flows through diode 30 in a half cycle, to conduct a part of the current in the read-out winding 7 via the resistance 26, thereby to create a biasing magnetic field opposite in direction to the one created by the read-out winding 6 so as to make the resultant bias effect at a suitable small value. Should the value of resistance 26 be found to be too small for the control of the bias-like effect in practical design, it is advisable that a small resistance be inserted between the resistance 26 and each diode.

Figure 12:
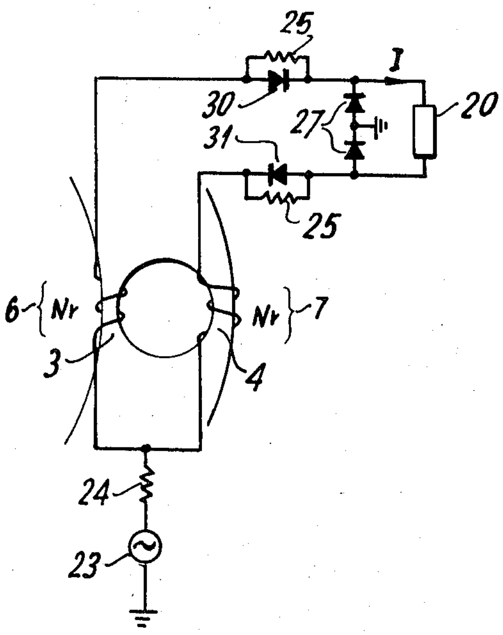

FIG. 12 illustrates a ninth embodiment of this invention. This embodiment may be considered an example of conversion from bridged to shunt resistance system of the eighth embodiment (FIG. 11), excepting that two additional diodes 27 are connected for conducting direct current in the load 20. With this arrangement, a suitable current can be conducted in the read-out winding connected to the diode in the nonconducting state through resistance 25 connected in shunt therewith. Obviously, the two biasing magnetic field directions oppose each other and the resultant bias effect can be minimized, provided the values of resistances 25 have been suitably determined. The diodes 27 may be replaced with two capacitors to constitute a voltage-doubler rectifier circuit.

Figure 13:
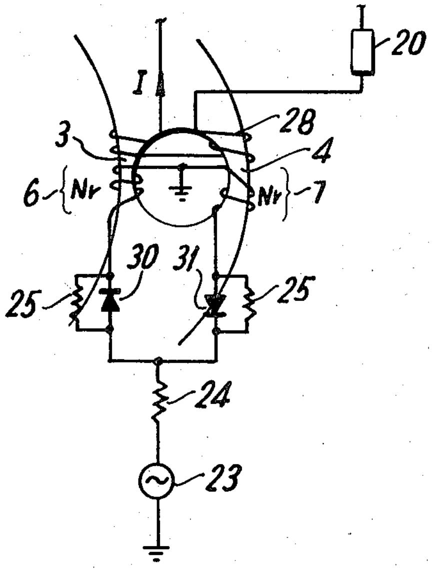

FIG. 13 illustrates a tenth embodiment of this invention. This circuit arrangement comprises, besides the read-out windings 6 and 7, an output winding connected to the load 20. The effect of the reducing the bias-like action or that of improving the control characteristics with this embodiment makes no difference from the one shown in FIG. 11.

Although the principles of this invention have been described above in connection with the preferred embodiments, it will be apparent by those skilled in the art that they are only exemplary and various modifications can be made in the circuit arrangement without departing from the scope of the present invention as defined in the appended claims.

We claim:

1. A circuit for the read-out portion of multi-aperture transfluxors, said circuit comprising two pairs of similar read-out windings provided on two opposing yokes which constitute, in combination, a part of a read-out magnetic circuit in a core of magnetic material having a substantially rectangular hysteresis loop and a part of the write-in magnetic circuit in said core, each pair of said read-out windings consisting of two dissimilar windings connected in series and having a larger and a smaller number of turns wound on said two opposing yokes successively so as to produce additive ampereturns with respect to said read-out magnetic circuit, two of said pairs of read-out windings having a substantially equal total number of ampereturns and being opposite in polarity and the ratio of said larger to smaller number of turns in each of said pair of read-out windings being at a predetermined value for minimizing the bias-like magnetic effect caused by the total ampereturns in each of said two pairs of read-out windings with respect to the write-in magnetic circuit when said two pairs of read-out windings are driven alternatively by an external power source.

2. A circuit for the read-out portion of multi-aperture transfluxors, said circuit comprising two similar read-out windings respectively provided on two opposing yokes which constitute, in combination, a part of a read-out magnetic circuit in a core of magnetic material having a substantially rectangular hysteresis loop and a part of the write-in magnetic circuit, two semiconductor elements respectively connected to said two read-out windings in series therewith, means coupling one or two resistance means to said two semiconductor elements for producing two alternatively acting by-pass routes through said resistance means with respect to either of said semiconductor elements in the non-conducting period thereof for energizing that read-out winding which is coupled to the one of said semiconductor elements which is at that time in the nonconducting period, said resistance means having a predetermined value for minimizing the bias-like magnetic effect caused by the resultant ampereturns in said two read-out windings with respect to the write-in magnetic circuit when the said two read-out windings are alternatively driven by an external power source.

3. A transfluxor circuit for non-destructive storage of an analog signal and for providing across a load a signal representative of the stored analog signal comprising:
- a magnetic transfluxor of the multi-aperture type and having a write-in yoke and a first and second read-out yoke on opposite sides of an aperture,
- means for producing a write-in magnetic flux in the transfluxor proportional in magnitude to the analog signal, said write-in flux linking the write-in and read-out yokes,
- a first winding inductively coupled to the first read-out yoke,
- a second winding inductively coupled to the second read-out yoke,
- means for producing recurring pulses and applying said pulses alternately through the first and second windings to the load wherein current flowing in the first and second windings from said pulses induces a bias flux of a first direction in said first and second yokes,
- first means responsive to current flowing through the first winding for producing a flux in the second yoke in a direction opposite to the direction of the bias flux,
- second means responsive to current flowing through the second winding for producing a flux in the first yoke in a direction opposite to the direction of the bias flux,
- with the magnitude of the opposing fluxes produced with said first and second means selected to impart a linear response characteristic to the transfluxor circuit.

4. The device as recited in claim 3 wherein said first and second means respectively comprise:
- a third winding in series ampere-turn-aiding connection with the first winding and wound about the second read-out yoke in a direction tending to produce a flux therein in response to a pulse applied to the first winding with said flux having a direction opposite to the bias flux,
- a fourth winding in series ampere-turn-aiding connection with the second winding and wound about the second read-out yoke in a direction tending to produce a flux therein in response to a pulse applied to the second winding with said flux having a direction opposite to the bias flux.

5. The device as recited in claim 4 wherein said recurring pulse-producing means further comprises:
- a source of oscillating signals,
- a transformer having a primary and a center-tapped secondary, with the primary coupled to the oscillating signals,
- a pair of diodes, with like electrodes of the diodes coupled to end terminals of the transformer secondary and with the other electrodes of the diodes individually coupled respectively to the first and second windings, with the load being coupled to a return terminal which is also coupled to the center tap of the secondary.

6. The device as recited in claim 4 wherein said recurring pulse-producing means further comprises:
- a source of oscillating signals,
- a pair of diodes having unlike electrodes coupled to the oscillating signals and having the other electrodes of the diodes individually coupled to the first and second windings.

7. The device as recited in claim 6 and further comprising:
- a second pair of diodes having unlike electrodes coupled together with the series-connected diodes placed across the load and the unlike electrodes coupled to a return terminal connected to the source of oscillating signals and with the third and fourth windings coupled to opposite electrical ends of the load.

8. The device as recited in claim 6 and further comprising:
- a pair of capacitors, each having a plate coupled to one another and a return terminal also coupled to the source of oscillating signals, with the series capacitors coupled across the load and with the load interconnecting the third and fourth windings.

9. The device as recited in claim 4 wherein the third and fourth windings are coupled to one another and a return terminal, with the return terminal coupled to the means for producing the recurring pulses,
- a fifth output winding inductively coupled to said first and second read-out yokes and coupled across the load.

10. The device as recited in claim 3 wherein said first and second means further comprise:

a pair of shunt resistance systems which each system including a resistor shunting a diode, with like electrodes of the diodes individually coupled to alternating recurring pulses and the other diode electrodes respectively coupled to said first and second windings with the other end of the first and second windings coupled to one another and the load, and a return terminal coupled to the load and the recurring-pulse-producing means.

11. The device as recited in claim 3 wherein the first and second means further comprise:

a resistor coupled across one end of the first and second windings with the other end of said windings coupled to said alternating recurring pulses, a pair of diodes having like electrodes coupled respectively to said one end of the first and second windings and the other like diode electrodes coupled to the load.

12. The device as recited in claim 11 wherein said diodes have their other like electrodes coupled to one another and the load.

13. The device as recited in claim 3 wherein the first and second means further comprise:

a pair of diodes selectively interconnecting recurring pulses to one end of said first and second windings, and a resistor coupled across said one end of said windings, with the other end of said windings coupled to the load.

14. The device as recited in claim 13 wherein said recurring-pulse-producing means comprises:

a source of oscillating signals, and wherein unlike electrodes of the diodes are coupled to one another and the oscillating signals and a return terminal coupled to the load and the source.

15. The device as recited in claim 3 wherein the first and second means further comprise:

a pair of shunt resistance systems with each system including a resistor shunting a diode, with each syster interconnecting one end of the first and second windings across the load with the other end of the windings coupled to the recurring-pulse-producing means, and a pair of series-connected diodes placed across the load with the common junction between the series-connected diodes coupled to a return terminal also coupled to the recurring-pulse-producing means.

16. The device as recited in claim 3 wherein the first and second means further comprise:

a pair of shunt resistance systems with each system including a resistor shunting a diode, with each system interconnecting one end of the first and second windings across the load with the other end of the windings coupled to the recurring-pulse-producing means, and a pair of series-connected capacitors placed across the load with the common junction between the capacitors coupled to a return terminal also coupled to the recurring-pulse-producing means.

17. The device as recited in claim 3 wherein said first and second means further comprise:

a pair of shunt resistance systems with each system including a resistor shunting a diode, with each system coupling alternating pulses to one end of said first and second windings, the other end of said first and second winding being coupled to one another and a return terminal also coupled to the recurring-pulse-producing means, and a fifth winding inductively coupled to said first and second read-out yokes and coupled to the load.

18. The device as recited in claim 17 wherein said recurring-pulse-producing means includes:

a source of oscillating signals, and wherein the diodes in said shunt resistance systems having unlike electrodes coupled to the oscillating signals.

References Cited

UNITED STATES PATENTS

| | | | |
|---|---|---|---|
| 2,905,834 | 9/1959 | Arsenault et al. | 307—88 |
| 2,934,750 | 4/1960 | Schaefer | 340—174 |
| 3,214,600 | 10/1965 | Schreiber | 307—88 |

STANLEY M. URYNOWICZ, Jr., Primary Examiner